US011287985B2

(12) United States Patent
Colline et al.

(10) Patent No.: US 11,287,985 B2
(45) Date of Patent: Mar. 29, 2022

(54) NETWORK DATA STORAGE BUFFER SYSTEM

(71) Applicant: Seagate Technology LLC, Cupertino, CA (US)

(72) Inventors: Phillip R. Colline, Tustin, CA (US); Michael Barrell, Longmont, CO (US)

(73) Assignee: SEAGATE TECHNOLOGY LLC

( * ) Notice: Subject to any disclaimer, the term of this patent is extended or adjusted under 35 U.S.C. 154(b) by 727 days.

(21) Appl. No.: 15/597,881

(22) Filed: May 17, 2017

(65) Prior Publication Data
US 2018/0335961 A1 Nov. 22, 2018

(51) Int. Cl.
*G06F 3/06* (2006.01)
*G06F 13/42* (2006.01)

(52) U.S. Cl.
CPC ............ *G06F 3/0619* (2013.01); *G06F 3/061* (2013.01); *G06F 3/067* (2013.01); *G06F 3/0656* (2013.01); *G06F 3/0659* (2013.01); *G06F 13/4282* (2013.01); *G06F 2213/0026* (2013.01)

(58) Field of Classification Search
CPC ...................................... G06F 3/0619
USPC ........................................... 711/103
See application file for complete search history.

(56) References Cited

U.S. PATENT DOCUMENTS

| 5,163,131 | A | 11/1992 | Row et al. |
|---|---|---|---|
| 6,751,698 | B1 | 6/2004 | Deneroff et al. |
| 7,231,412 | B2 | 6/2007 | Hitz et al. |
| 7,929,442 | B2 | 4/2011 | Connor et al. |
| 9,009,293 | B2 | 4/2015 | Batz et al. |
| 9,049,046 | B2 | 6/2015 | Andreasen et al. |
| 9,210,122 | B2 | 12/2015 | Batz et al. |
| 9,246,825 | B2 | 1/2016 | Jilani et al. |
| 2007/0038749 | A1 | 2/2007 | Noya et al. |
| 2013/0227201 | A1 | 8/2013 | Talagala et al. |

*Primary Examiner* — Jae U Yu
(74) *Attorney, Agent, or Firm* — Hall Estill Law Firm

(57) ABSTRACT

A data storage network may have multiple data storage devices that each consist of a device buffer. A network buffer and buffer circuit can be found in a network controller with the buffer circuit arranged to divide and store data associated with a data access request in the network buffer and the device buffer of the first data storage device.

19 Claims, 3 Drawing Sheets

NETWORK DATA STORAGE BUFFER SYSTEM

SUMMARY

A network based data storage system, in accordance with some embodiments, has multiple data storage devices that each consist of a device buffer. A network buffer and buffer circuit are in a network controller with the buffer circuit arranged to divide and store data associated with a data access request in the network buffer and the device buffer of the first data storage device.

DETAILED DESCRIPTION

Technological advancements have made data generation, data transfer, and data storage more prevalent. The increased amounts of data being stored and subsequently read has been met with computing hardware innovations that reduce the latency of data access requests. However, despite innovations, bottlenecks exist in many data storage environments where multiple data storage devices are connected in a network, such as in a cloud computing environment.

Hence, various embodiments of the present disclosure are directed to data storage networks with a sophisticated data buffering system that increases data access performance by mitigating computing operations by hardware having relatively high data latency times. By eliminating the temporary storage of data in a network buffer where hardware has reduced data transfer speeds, data being written to the network can be temporarily stored in buffers of individual network devices where internal hardware are conducive to faster data transfer speeds. The relocation of temporary network buffers allows a network controller to utilize high-speed data protocol and buses of individual storage devices instead of in the network controller, which optimizes data throughput and latency without requiring any specialized hardware, software, or firmware modifications.

Figure 1:
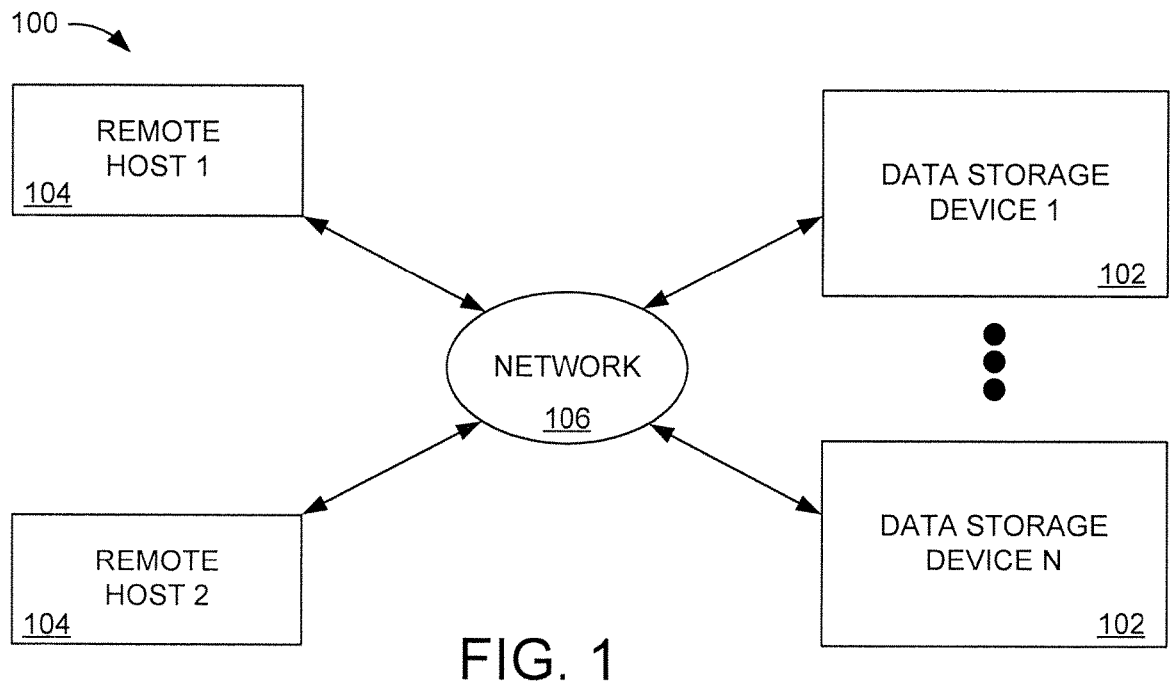
FIG. 1 is a line representation of an example data storage system where various embodiments of this disclosure can be practiced.

FIG. 1 illustrates an example data storage system 100 where various embodiments of the present disclosure can be practiced. The system 100 can have any number and type of data storage device 102 that is connected to one or more remote hosts 104 via a wired and/or wireless network 106. In the non-limiting example of FIG. 1, first and second data storage devices 102 can concurrently or individually conduct data access operations, such as data reads, data writes, and data maintenance, to satisfy requests made by multiple different remote hosts 104.

A data storage device 102 of the data storage system 100 can be any non-volatile memory, such as rotating magnetic disks, solid-state arrays, or a hybrid memory with both rotating and solid-state data memory. The remote hosts 104 can be any computing component, such as a controller, computing device, network node, server, or server. The interconnection of the various devices 102 with the remote hosts 104 as part of a network 106 allows the hosts 104 to be enjoy greater computing power and/or data storage capabilities than what is physically part of the host 104.

Figure 2:
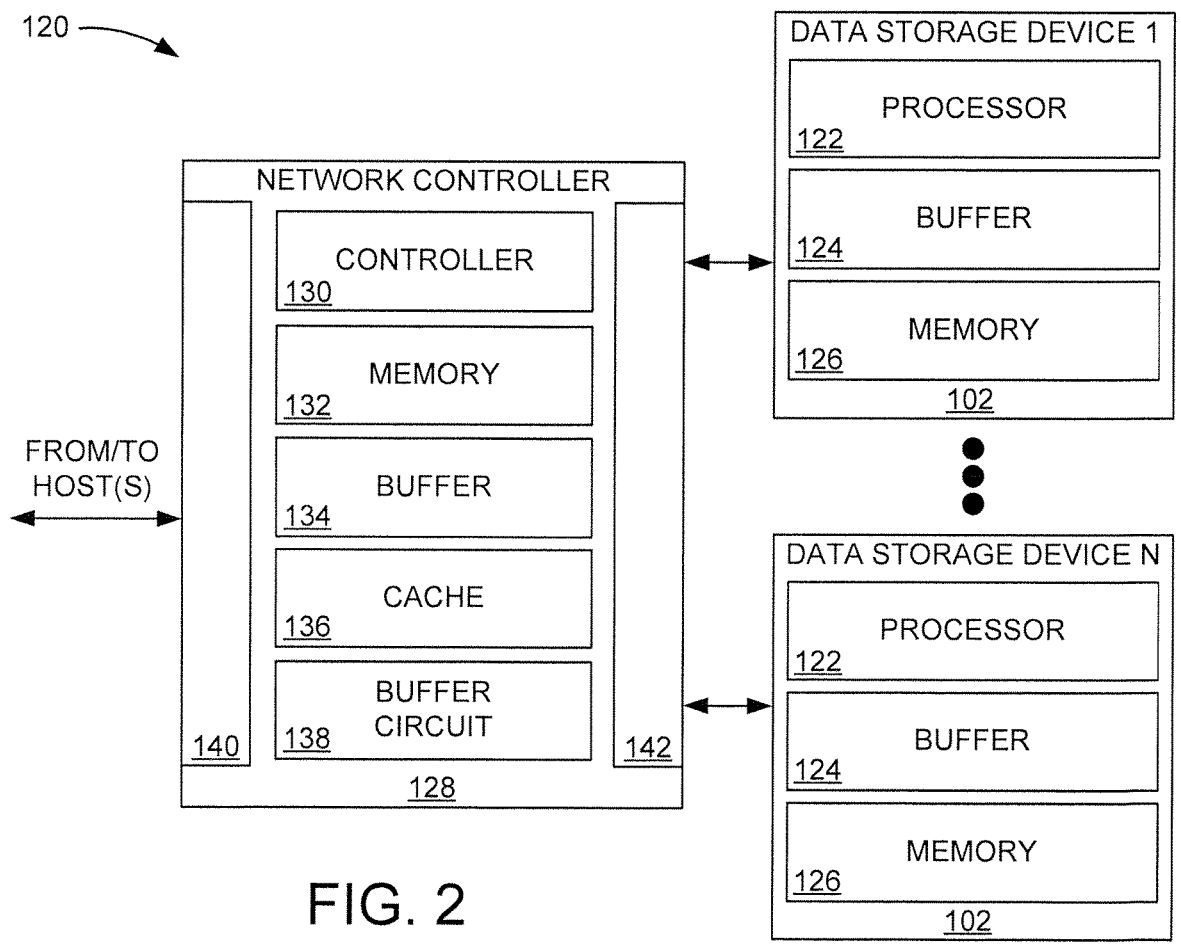
FIG. 2 displays an example data storage network arranged in accordance with various embodiments.

FIG. 2 is a block representation of an example data storage network 120 that can be incorporated into the data storage system 100 of FIG. 1. The storage network 120 has N number of separate data storage devices 102 that may be physically separate or physically interconnected as part of a data enclosure and/or data storage rack in a cloud computing environment. Each data storage device 102 has a local controller 122 that directs data access operations within, and between, temporary memory 124 and permanent memory 126. It is noted that temporary memory 124 can be characterized as a buffer that is non-volatile while permanent memory 126 can be any non-volatile memory type with a data capacity that is generally greater than the buffer of the particular data storage device 102.

With multiple remote hosts 104 potentially issuing numerous data access requests from the collective memory provided by the N data storage devices 102, a network controller 128 is positioned between the storage devices 102 and the remote hosts 104 to organize and direct data access operations to, and from, the various data storage devices 102. In the event the assorted data storage devices 102 are utilized as a redundant array of independent devices (RAID), a controller 130 of the network controller 128 can execute data processing, such as generating parity data, organizing parity data, mirroring data, and/or striping data across multiple different data storage devices 102.

The network controller 128 can consist of various memories that can be physically separate or logically segmented by the network controller 130 into a long-term memory 132, short-term buffer 134, and short-term cache 136. While not required or limiting, the memory 132 and buffer 134 can be arranged as non-volatile data storage structures and the cache 136 can be a volatile type of memory. It is contemplated that the various data storage aspects of the network controller 128 are different types of memory, such as NAND Flash or phase change solid-state memory, that have common, or dissimilar, data access speeds and capacities.

It is noted that the various memory structures of the network controller 128 may be utilized to store some, or all, of the data that satisfies each data access request from one or more remote hosts. For example, data being written to the data storage devices 102 and data read from the data storage devices 102 may be temporarily, or permanently, stored in the memory 132, buffer 134, and cache 136 prior to passing to the requesting host or to the data storage devices 102, respectively. The storage of data associated with data access requests in the network controller 128 can allow for data processing, such as validating data accuracy, eliminating redundancy, or parsing unrequested data.

The storage of data associated with data access requests in the network controller 128 consumes system resources, like bus bandwidth, and time. Hence, various embodiments are directed to intelligently storing data associated with data access requests in the network controller 128, the buffers 124 of the respective data storage devices 102, or both. A buffer circuit 138 of the network controller 128 can utilize the computing power of the controller 130 to intelligently handle data coming into a front-end interface 140 during a write request and data coming into to back-end interface 142 during a read request by determining how and where the data of the data access request is stored to maximize system performance, such as request satisfaction latency.

For clarity, but in no way limiting, the buffer circuit 138 can direct data read requests received by the front-end interface 140 from one or more remote hosts to at least one data storage device 102 via the back-end interface 142 after the controller 130 processes one or more software operations on the data. The buffer circuit 138 can also utilize the front-end interface 140 and back-end interface 142 to execute a data write request as data is ultimately written to one or more data storage devices 102. It is contemplated that storing some, or all, of a data read, or data write, request to network controller memory can cause a bottleneck in the network controller 128 that degrades network 120 performance.

Accordingly, the buffer circuit 138 is configured, in some embodiments, to reduce, or eliminate, the copying of data to the network controller 128. By evaluating a data access request and the status of the network 120, the buffer circuit 138 can utilize system hardware that provides the fastest execution and satisfaction of the data access request. A non-limiting example passes the data of a data write request through the network controller 128 to the buffer(s) 124 of one or more data storage device 102 without storing any portion of the data in the network controller 128. Another example passes data of a data read request directly from the data storage device buffer(s) 124 to the requesting host without storing the read data in the network controller 128. It is noted that the front-end protocol chip, such as SAS iSCSI, and FC, itself has flow control and at least one other temporary buffer, which may be on the order of a few kilobytes in size, to allow for PCIe and protocol specific data movement.

In yet, the buffer circuit 138 is not required to pass data through the network controller 128. The buffer circuit 138 may store a data portion, which has a smaller data size than the entirety of the access data, in the network controller 128 while passing the remaining amount of the access data to the device buffers 124, for a write request, or to the requesting host, for a read request. The ability to intelligently determine if data of a data access request is to be divided between different memory regions of the network 120 allows the buffer circuit 138 to provide optimized data access request satisfaction in diverse network conditions, such as high volumes of data access requests, large data sizes for data access requests, or high RAID data level.

Figure 3:
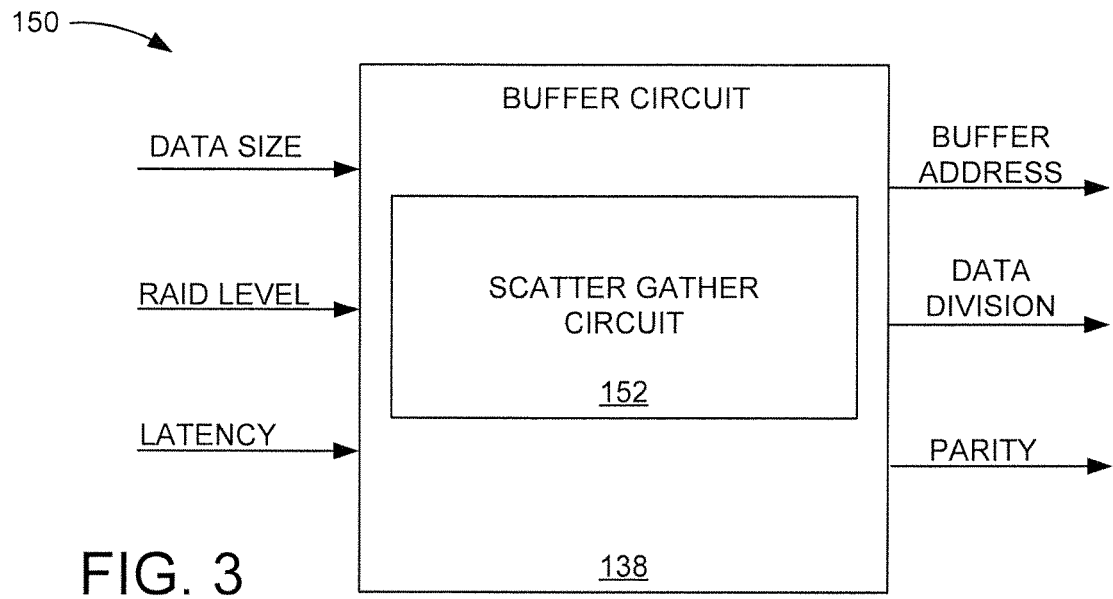
FIG. 3 illustrates an example buffer circuit that can be employed in the data storage network of FIG. 2.

FIG. 3 represents an example buffer module 150 that can be employed in the data storage network 120 of FIG. 2 to intelligently handle data access requests. A buffer circuit 138 can be resident in a network controller to continuously, or sporadically, log one or more network conditions to determine how and where data of a data access request is to be buffered. The buffer circuit 138 may monitor the data size of a data access request, the RAID level of the data, and the latency of various aspects of the network to determine how to satisfy a data access request in the least time. It is contemplated that the buffer circuit 138 can predict future data access request satisfaction latency by comparing current network conditions to previously logged data access request satisfaction latencies.

In response to these and potentially other network characteristics, the buffer circuit 138 can provide the network controller with one or more different buffer addresses where data of the data access request is to be stored. The buffer addresses can correspond with dividing the data into multiple data packets that are stored in separate buffers of the network. The buffer circuit 138 can further designate the location, of parity data generation and storage.

As a result of the buffer circuit 138 passing at least some of the data of a data access request through the network controller without storage in the network buffer, a scatter gather circuit 152 directs the network controller 128 to the buffer addresses determined by the buffer circuit. Hence, the scatter gather circuit 152 can store a table in network memory, cache, or buffer that points the controller 130 to the outputted buffer address of the buffer circuit 138 to allow data reconstruction for a read request or the device buffers 124 as extension of the network control buffer 134.

Figure 4:
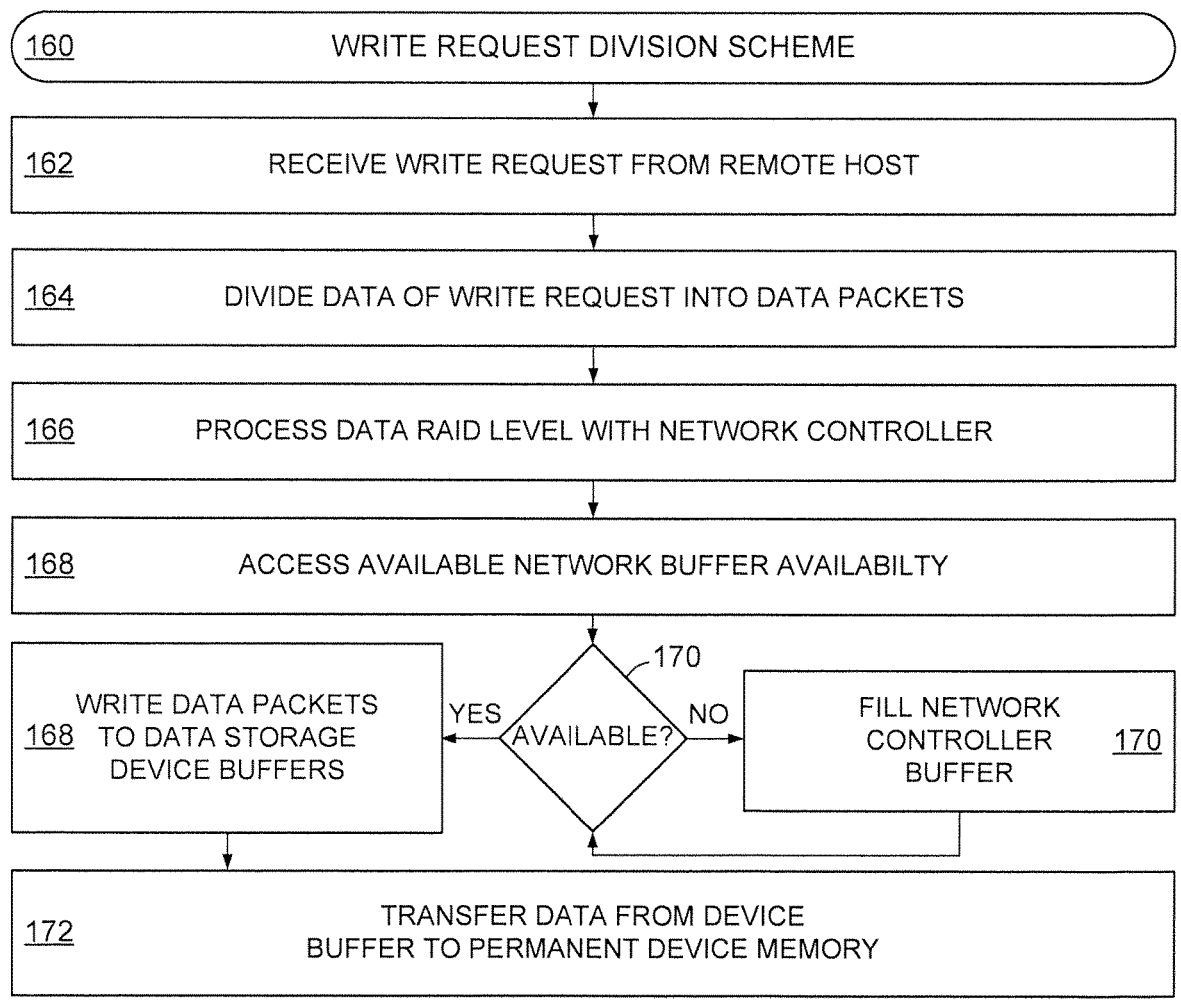
FIG. 4 depicts an example write request division scheme that may be executed by the data storage network of FIG. 2.

FIG. 4 is an example write request division scheme 160 that can be executed by the data storage network 120 of FIG. 2. When a data write request is received from a remote host in step 162, a buffer circuit can evaluate any number of network conditions to determine how to divide the data of the data write request in step 164. The network controller can process at least some of the divided data in step 166 prior to, or while, step 168 accesses the availability of one or more buffers in the network.

Decision 170 concludes if enough buffer space is available in the locations assigned by the buffer circuit in step 164 to satisfy the data write request. If so, step 168 proceeds to write data packets to the assigned device buffers. In the event the device buffers do not have enough space to store the incoming write data, step 170 temporarily writes data packets in the network controller until the device buffers become available.

It is noted that passing data directly to the device buffers without storing the data in the network controller can require the device buffers to individually have relatively large capacities. For example, each device buffer may have a greater capacity than the network buffer, memory, or cache while being smaller than the permanent memory of each device. When the various divided portions of the write data are stored in the designated locations, step 172 subsequently transfers the data from the device buffer to the permanent device memory. In some embodiments, step 172 can send the data packet(s) stored in the device buffer to the permanent memory of a different data storage device, but such arrangement is not required as the buffer circuit can direct data packets to be stored in the device buffer of the data storage device where the permanent memory is located.

If the buffer circuit directs some of the divided data to be stored in the network controller, step 172 may transfer those data packets to the permanent memory of one or more different data storage devices at some later time that may differ from the time when data is moved from the device buffer to the device permanent memory. Through the dividing of data of a data write request into data packets, the buffer circuit can minimize network bottlenecks and optimize data request satisfaction based on real-time network conditions by storing some data in the network controller or bypassing the storage of data in the network controller completely.

By passing as much of a data write request as possible to the respective data storage devices, steps 168 and 172 can be executed with faster technology than if the data was entirely stored in the network controller. That is, the advent of NVM express (NVMe) interface specification in data storage devices allows for much faster data transfer by employing more sophisticated bus management than the interface protocol available for the network controller that has to manage the front-end 140 and back-end 142 interfaces.

Figure 5:
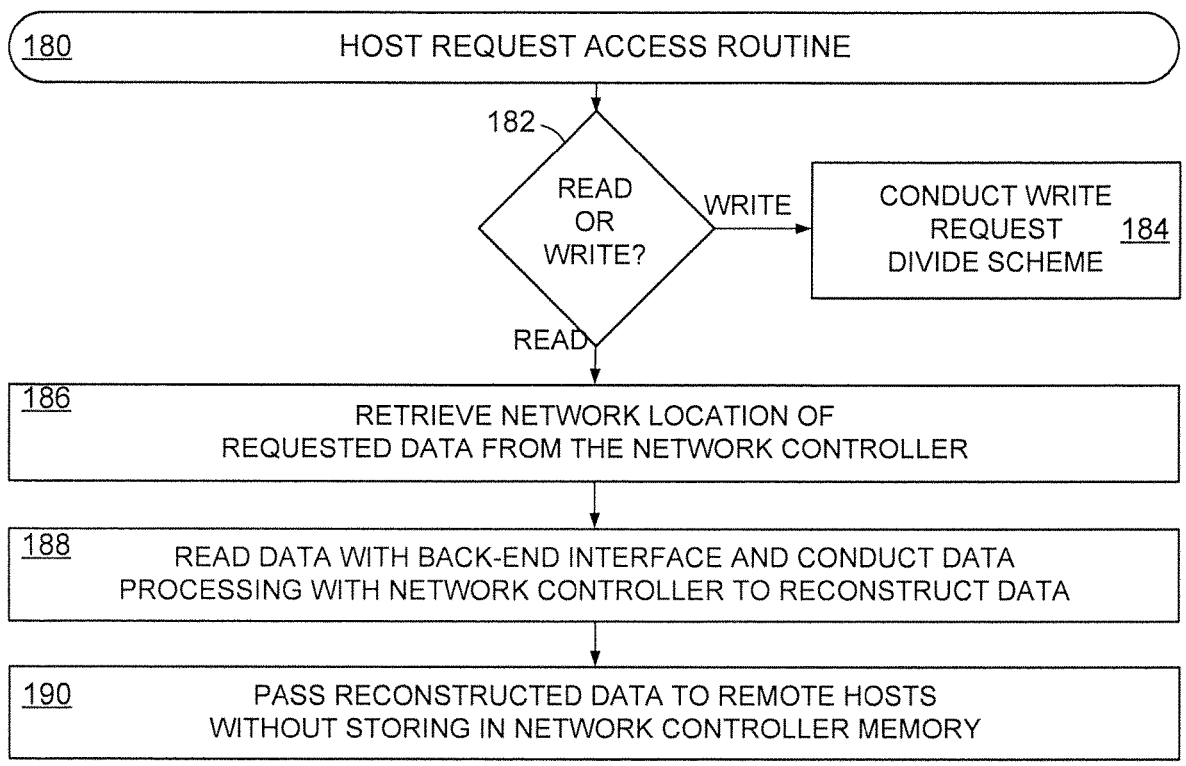
FIG. 5 provides an example host request access routine that is carried out with the data storage network of FIG. 2.

An example host request access routine 180 is shown in FIG. 5 that can also be carried out by the data storage network of FIG. 2 in accordance with some embodiments. The routine 180 can begin with decision 182 determining if a pending host request is a data read or a data write. A data write request is handled in step 184 according to the write request divide scheme of FIG. 4. A data read request proceeds to step 186 where the network location of the requested data is retrieved from the network controller, such as the scatter gather circuit.

Next, step 188 reads data from the respective data storage devices with the back-end interface of the network controller then processes the data with various software/firmware aspects of the network controller. The reconstructed data from step 188 is subsequently supplied to the requesting host(s) in step 190 without temporarily or permanently storing the data in the network controller. It is possible that at least a portion of the read data, or data created during the processing and reconstructing of the requested data, is temporarily stored in the network controller. However, such occasions are directed by the buffer circuit so that data stored in the network controller is less than the entirety of the requested data and does not inhibit bus throughput in the network controller.

In some embodiments, the requested read data is moved from the permanent memory of the respective data storage devices to the device buffer where data processing and reconstruction takes place, which replaces moving data to the network controller for the processing and reconstruction. In other words, the buffer circuit can selectively utilize the device buffers and/or memory of the network controller to satisfy a data read access request without hindering or degrading data throughput in the network controller.

Figure 6:
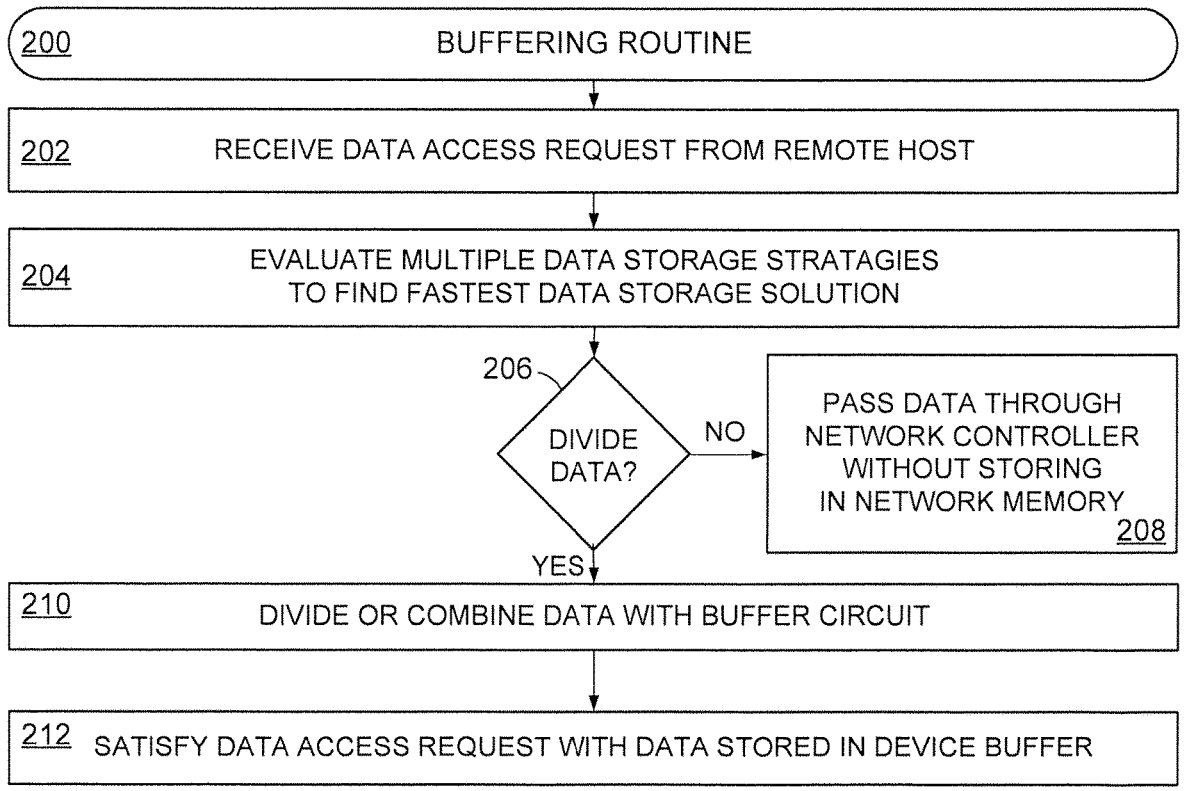
FIG. 6 conveys a buffering routine that can be executed by the data storage network of FIG. 2.

Although the optimization of data access request satisfaction can be evaluated and conducted by the buffer circuit at any time, such as before or during fulfillment of the access request, the buffer circuit conducts the example buffering routine 200 of FIG. 6 when a data access request is initially received by the front-end interface of a network controller, as shown in step 202. Prior to the data access request being satisfied, the buffer circuit evaluates one or more possible buffering strategies in step 204 for the present, real-time network conditions to find the fastest data storage solution to satisfy the data access request.

Step 204, in various embodiments, can predict unknown system parameters, such as network controller bus speed and volume, along with known system parameters, such as device buffer throughput, speed, and data latency, to find the optimized data storage solution. As a non-limiting example, step 204 can compare storing a portion of the data associated with the data access request in the network controller compared to bypassing any storage of the data in the network controller. It is contemplated that the buffer circuit can evaluate data of a data access request to be moved to the device buffer of other data storage devices to take advantage of parallelism and NVMe with multiple different data storage devices.

The data storage solution resulting from step 204 may call for data to be divided into data packets that are smaller portions of the data called for by the data access request. Decision 206 questions if the data of the data access request is to be divided. Step 208 is triggered with no division of data and passes data through the network controller without storing the data in the network controller memory. If data is to be divided, step 210 executes the data division into data packets as directed by the buffer circuit.

Step 210 may alternatively combine data packets into data that fulfills a data read request. Regardless of step 210 dividing or combining data, it is contemplated that the data is stored, at least partially, in the device buffers of one or more data storage devices. Routine 200 concludes with step 212 outputting the data of the data access request from the device buffer either to device permanent memory, for a write request, or to the remote host, for a read request.

With the intelligent handling of data access requests in accordance with various embodiments shown in FIGS. 1-6, data access requests can be more quickly satisfied in a network by taking advantage of the faster bus protocol and data latency of data storage devices compared to a network controller. By evaluating multiple different buffering possibilities with a buffer circuit, data can be kept whole, or divided into data packets, to allow for faster fulfillment of a data access request. The ability to selectively store some data in the network controller allows the buffer circuit to handle a diverse variety of data access situations by developing a data storage solution based on real-time network conditions.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a network controller connected to separate first and second data storage devices each having a device buffer, the network controller comprising a network buffer and a buffer circuit, the buffer circuit arranged to divide data associated with a data access request into a first data packet and a second data packet prior to bypassing the network buffer to store the first data packet in the device buffer of the first data storage device and the second data packet in the network buffer.

2. The apparatus of claim 1, wherein network controller, first data storage device, and second data storage device are connected as a redundant array of independent devices (RAID).

3. The apparatus of claim 1, wherein the first and second data storage devices are each non-volatile solid state memories.

4. The apparatus of claim 1, wherein the first and second data storage devices are different types of memory.

5. The apparatus of claim 1, wherein the network controller is connected to at least one remote host via a front-end interface and connected to the first and second data storage devices via a back-end interface, the back-end interface comprising a peripheral component interconnect express (PCIe) bus.

6. The apparatus of claim 1, wherein the first and second data storage devices communicate to the network controller via a non-volatile memory express (NVMe) protocol.

7. The apparatus of claim 1, wherein the first and second data storage devices have an M.2 form factor.

8. A method comprising:
connecting a network controller to separate first and second data storage devices, each data storage device having a device buffer, the network controller comprising a network buffer and a buffer circuit;
dividing data associated with a write request from a host with the buffer circuit into first and second data packets;

bypassing the network buffer to store the second data packet in the device buffer of the first data storage device as directed by the buffer circuit; and storing the first data packet in the network buffer as directed by the buffer circuit.

9. The method of claim 8, wherein the device buffer each data storage device has a greater data capacity than the network buffer.

10. The method of claim 8, wherein the first data packet is different than the second data packet.

11. The method of claim 8, wherein the first data packet has a smaller data size than the second data packet.

12. The method of claim 8, wherein the buffer circuit stores the first data packet in a cache memory of the network controller prior to the device buffer.

13. The method of claim 8, wherein the first and second data packets contain parity data associated with a redundant array of independent devices (RAID) level.

14. The method of claim 8, wherein the buffer circuit maintains a scatter gather list that specifies a destination address in the first or second data storage devices.

15. The method of claim 14, wherein the scatter gather list is generated by a programmable processor of the network controller when the write request is received by the network controller.

16. The method of claim 8, wherein the first and second data storage devices each have lower data latency than the network controller.

17. The method of claim 8, wherein the buffer circuit moves the first data packet to a memory array of a third data storage device.

18. The method of claim 8, wherein the buffer circuit moves the second data packet to a memory array of the second data storage device.

19. The method of claim 8, wherein each data storage device has a memory array with a greater data capacity than the network buffer.

* * * * *